(12) United States Patent
Mandl et al.

(10) Patent No.: US 8,640,370 B2
(45) Date of Patent: Feb. 4, 2014

(54) SIGN POST SYSTEM

(71) Applicant: Adapt-Eze Safety Products Ltd., Kelowna (CA)

(72) Inventors: Jeffrey Anton Mandl, Kelowna (CA); Clinton Bradely Merslack, Sorrento (CA)

(73) Assignee: Adapt-Eze Safety Products Ltd., Kelowna (CA)

( * ) Notice: Subject to any disclaimer, the term of this patent is extended or adjusted under 35 U.S.C. 154(b) by 0 days.

(21) Appl. No.: 13/712,863

(22) Filed: Dec. 12, 2012

(65) Prior Publication Data

US 2013/0185971 A1 Jul. 25, 2013

(51) Int. Cl.
*G06F 15/00* (2006.01)

(52) U.S. Cl.
USPC ............... 40/606.01; 40/606.15; 40/607.01; 116/63 P; 256/13.1

(58) Field of Classification Search
USPC ............ 40/606.15, 606.01, 606.03, 607.01, 40/607.09; 116/63 R, 63 P; 256/13.1
See application file for complete search history.

(56) References Cited

U.S. PATENT DOCUMENTS

| 1,833,124 | A | | 11/1931 | Rand |
| 1,913,101 | A | | 6/1933 | Bellows |
| 2,550,338 | A | | 4/1951 | Dunagan |
| 3,085,546 | A | | 4/1963 | Pelletier |
| 3,552,702 | A | | 1/1971 | Springer |
| 3,678,815 | A | * | 7/1972 | Younker ............................ 14/73 |
| 3,825,229 | A | * | 7/1974 | Bartlett et al. ................... 256/59 |
| 3,877,681 | A | | 4/1975 | Humphrey |
| 4,071,970 | A | | 2/1978 | Strizki |
| 4,205,472 | A | | 6/1980 | Shirley |
| 4,342,168 | A | | 8/1982 | Schmanski |
| 4,681,302 | A | * | 7/1987 | Thompson ................... 256/13.1 |
| 4,930,961 | A | | 6/1990 | Weis |
| 4,954,009 | A | * | 9/1990 | Kellison ............................ 404/6 |
| 5,040,478 | A | | 8/1991 | Hughes |
| 5,080,269 | A | | 1/1992 | Larsson et al. |
| 5,244,172 | A | * | 9/1993 | Allega ........................... 248/161 |
| 5,277,146 | A | | 1/1994 | Hughes, Jr. |
| 5,423,142 | A | | 6/1995 | Douglas et al. |
| 5,878,519 | A | * | 3/1999 | Huyck et al. .................... 40/612 |
| 6,056,250 | A | | 5/2000 | Hillstrom et al. |
| 6,250,524 | B1 | | 6/2001 | Maruyama |
| 6,375,385 | B1 | | 4/2002 | Kennedy |
| 6,718,672 | B1 | * | 4/2004 | Wieringa ......................... 40/612 |
| 6,951,434 | B2 | * | 10/2005 | Yodock et al. .................... 404/6 |
| 6,974,291 | B2 | | 12/2005 | Li |
| 6,996,888 | B1 | | 2/2006 | Wieringa |
| 7,014,389 | B1 | * | 3/2006 | Siblik ............................. 404/10 |
| 7,047,680 | B2 | * | 5/2006 | Myles ......................... 40/607.1 |

(Continued)

*Primary Examiner* — Gary Hoge
(74) *Attorney, Agent, or Firm* — Antony C. Edwards

(57) ABSTRACT

A signpost system includes a signpost system includes a signpost having a lower-most base end and an opposite upper end opposite the base end, a bore clamp including at least a traffic-side clamp member and a shoulder-side clamp member wherein the traffic-side clamp member is adapted to substantially mount flush into the traffic-side of the bore in the barrier and wherein the shoulder-side clamp member is adapted to mount onto the shoulder-side of the bore, and an elongate selectively adjustable tensioner extending from and between the clamp members for mounting the clamp members in the traffic-side and in the shoulder-side of the bore respectively, and wherein the shoulder-side clamp member is adapted for mounting to the base end of the signpost.

19 Claims, 15 Drawing Sheets

(56) References Cited

U.S. PATENT DOCUMENTS

| | | |
|---|---|---|
| 7,163,142 B2 | 1/2007 | DeLine et al. |
| 7,473,051 B2 * | 1/2009 | Audet .............................. 404/10 |
| 7,698,843 B2 | 4/2010 | Hillstrom et al. |
| 8,002,493 B2 * | 8/2011 | Audet .............................. 404/10 |
| 2004/0141807 A1 * | 7/2004 | Yodock et al. .................... 404/6 |
| 2004/0197140 A1 * | 10/2004 | Maleska ........................... 404/6 |
| 2005/0091893 A1 | 5/2005 | Bruegmann |
| 2007/0006793 A1 | 1/2007 | Corker et al. |
| 2008/0085149 A1 | 4/2008 | Gamache |
| 2008/0086924 A1 | 4/2008 | Kicher et al. |
| 2008/0307684 A1 * | 12/2008 | Ulloa et al. .................. 40/607.1 |
| 2010/0126051 A1 | 5/2010 | Kerton et al. |
| 2010/0189497 A1 | 7/2010 | Hughes, Sr. |
| 2010/0254761 A1 | 10/2010 | Wheeler, Jr. |

* cited by examiner

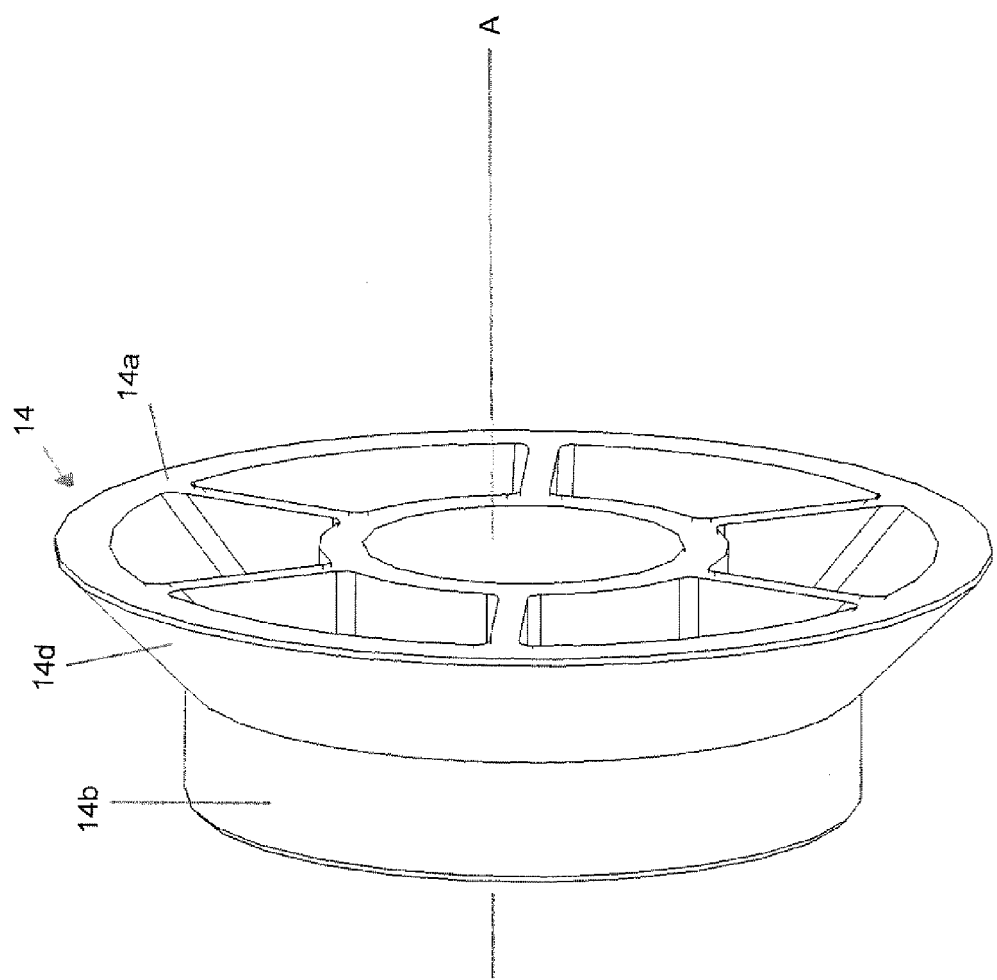

SIGN POST SYSTEM

CROSS REFERENCE TO RELATED APPLICATION

This application claims priority from Canadian Patent Application No. 2,761,835 filed Dec. 12, 2011 entitled SIGN POST SYSTEM.

FIELD OF THE INVENTION

This invention relates to the field of traffic, roadway and highway signs and in particular to a sign post system which includes mounting signs to their corresponding sign posts and the mounting of the sign posts to concrete and other roadside barriers.

BACKGROUND OF THE INVENTION

One object of the present invention is to reduce the damage done to signs and their corresponding sign posts when the signs are mounted for viewing alongside roadways and highways and are suspended from a sign post which is mounted to a concrete or other roadway barrier. Typically, damage may occur when the sign or signpost is struck by snow thrown by a snowplough or is struck by the snowplough blade itself. This problem is recognized in the prior art and applicant is aware of various patent references which attempt to address the problem.

For example, as stated by Shirley in his U.S. Pat. No. 4,205,472, which issued Jun. 3, 1980 for his Yieldable Delayed Action Roadway and Signing Apparatus, on vehicle roadways, particularly in areas where roadways are covered with snow for a part of the year, a continuing problem is the damage and destruction of highway signs and delineators situated at the side of the road for the guidance and warning of passing motorists. Of necessity such signs and delineators must be in close proximity to the roadway so that they can be readily observed by passing motorists. Because of their proximity to the edge of the road they are subject to damage by weed mowers and snowploughs and occasionally by automobiles. In the winter months when the roadways and adjacent areas are covered with snow it is quite easy for snowplough operators to accidentally damage or ruin signs at the side of the road. They must remove enough snow to uncover the roadway and in doing so in deep snow they are likely to remove snow from too wide a path and run into the roadside marker. Mowers also do accidental damage frequently.

A number of attempts have been made by workers in the prior art to find solutions to this problem and solutions have been advanced. They may take the form of a flexible post which by some means can be pushed over and after being passed over by the snowplough spring back up to its original position. However, these ideas may not have been widely adopted because the devices are almost as susceptible to injury as the original posts. Although they theoretically have resilient properties and can spring back to their original position after having been knocked over, in practice the snowplough can completely uproot such posts or sever them or otherwise irreparably damage them.

What Shirley provides is a sign standard which is positioned a safe distance from the roadway to avoid snowploughs, etc. A horizontal movable arm extends from the standard towards the roadway. A sign is carried at the free end of the arm suspended from the arm by the hinges so that the sign can yield when struck. The arm is rotatably mounted on the standard so that the arm and sign may be moved aside if struck. The standard is mounted into the ground. The base end of the arm is mounted into a sleeve in the upper end of the standard. A spring urges the arm to its undeflected position where the arm seats in a notch.

Applicant is also aware of U.S. Pat. No. 3,085,546 which issued to Pelletier on Apr. 16, 1963 for a Traffic Sign. Pelletier describes that an object of this invention resides in providing a traffic sign having means for preventing damage by a motor vehicle when struck by the motor vehicle or other moving objects, for example, when traffic signs are buried in snow and are struck by snowploughs, snowblowers, and the like on highways. Pelletier describes a sign panel which is supported by a horizontal arm which can swing in a vertical plane at right angles to the long axis of the arm so as to clear an object hitting the sign above or below its pivotal connection to the arm, so that the sign always returns to its original vertical position after clearing the striking object. Pelletier discloses that the sign is rigidly secured to an elongate plate like bracket and that the sign is elastically maintained in a vertical plane by means of a coil spring. Pelletier states that if the sign is struck by a moving vehicle or the like, the sign will swing or rotate with respect to the arm to clear the moving object and will return to its vertical position, and depending on the area and force of impact on the sign of the movable object such as a motor vehicle snowplough or the like, either only the sign will rotate with respect to the arm or the arm will pivot with respect to a post on which the arm is mounted, or that there will be a combination of sign rotation and arm pivoting movement. Pelletier observes that his sign is particularly useful in winter time when its frequently happens that road signs are partly or completely buried in snow banks and are very liable to be hit by a snowplough or the like.

Applicant is also aware of U.S. Pat. No. 5,277,146 which issued Jan. 11, 1994, to Hughes Jr., for his Laterally Supported Flexible Sign wherein Hughes states that prior patents have shown yielding roadway signs attached to sign posts by some type of hinge which allows the sign to pivot. Hughes Jr. describes his invention as a rigid sign post where a series of rigid braces are attached to a mounting bracket on the post by a flexible elastomeric sleeve wherein the sign is mounted to the braces. The elastomeric sleeve allows the sleeve and braces to move relative to the sign post after the sign has been hit by a passing object. The sign returns to its original position once the object has passed by.

What is neither taught nor suggested, and what is described herein is a system for mounting a sign and its post to a concrete barrier of the kind placed along side roadways and highways. The post is mounted to minimize damage occasioned by snowploughs and the like striking the base mount of the post where the post is mounted to the concrete barrier. A means is provided for hanging a sign from the upper end of the sign post so that the sign may be deflected and rotated about at least two degrees of freedom when struck by an object such as snow thrown by a snowplough or by the snowplough blade as the road adjacent the concrete barrier is ploughed.

SUMMARY OF THE INVENTION

In summary, the signpost system according to aspects of the invention is for mounting of a sign to a signpost and for mounting the signpost to a barrier having a generally horizontal bore extending completely through the barrier from a traffic side to a shoulder side of the barrier. The system may be characterized as including in one aspect:
  a) a signpost having a lower-most base end and an opposite upper end opposite the base end, b) a bore clamp comprising at least a traffic-side clamp member and a shoulder-side clamp member wherein the traffic-side clamp member is adapted to substantially mount flush into the traffic-side of the bore in the barrier and wherein the shoulder-side clamp member is adapted to mount onto the shoulder-side of the bore, and c) an elongate selectively adjustable tensioner extending from and between the clamp members for mounting the clamp members in the traffic-side and in the shoulder-side of the bore respectively, and wherein the shoulder-side clamp member is adapted for mounting to the base end of the signpost.

Preferably the clamps are shaped to seat into opposite ends of the bore. The tensioner may be an elongated threaded fastener, for example a rigid member which is threaded at least on one end.

Each clamp member has a substantially centroidal hole positioned and aligned for substantially co-axial alignment along a substantially centroidal longitudinal bore axis of the bore so as to receive the rigid member journalled therein. The traffic-side clamp member advantageously has a substantially planar exterior surface for flush mounting into the bore so that neither the clamp member nor the rigid member protrudes past the exterior surface of the traffic-side clamp member.

At least two pairs of signpost mounting holes are formed in the exterior surface of the shoulder-side clamp member. The mounting holes are radially spaced array around the centroidal hole in the shoulder-side clamp member. Each of the pairs of mounting holes is positioned diametrically across the centroidal hole for vertical mounting of the signpost to the shoulder-side clamp member.

Advantageously the exterior surfaces of the clamp members have rims which are wider than their corresponding openings into the barrier bore. An underside of each rim may be bevelled to snug the rims into corresponding openings in the ends of the bore upon tensioning of the tensioner to draw the clamp members towards one another.

The upper end of the signpost may include an arm extending over the barrier when the base end of the signpost is mounted on the shoulder-side clamp member. A resiliently twistable hinge joint is mounted to and between the arm and the sign so as to suspend the sign below the arm. The resiliently twistable hinge joint allows hinged rotation of the sign about the arm and allows simultaneous twisting rotation of the sign about a substantially vertical axis of rotation as the sign twists when impacted by a force which is off-centre relative to the sign. The hinged rotation and the twisting rotations are substantially orthogonal to one another. The rotations deflect the hinge joint against a return resilient biasing of the hinge joint resiliently biasing the sign to return to an undeflected position hanging vertically and in a plane which is substantially coplanar with a plane containing the arm.

The joint may be a sheet of resiliently bendable and twistable material adapted for mounting the upper edge of the sheet to the arm and for mounting the opposite lower edge of the sheet to an upper edge of the sign. The sheet is sized to allow a twisting of the joint in a spacing between the arm and the sign. The larger the spacing the greater the degree of relative twisting rotation afforded between the arm and the sign upon force applied asymmetrically to the sign.

BRIEF DESCRIPTION OF THE DRAWINGS

In the drawings where like reference numerals denote corresponding parts in each view:

FIG. 2a is, in front perspective view, the traffic-side clamping member according to one embodiment of the clamping system according to the present invention.

FIG. 2b is, in frontal view, the traffic-side clamping member of FIG. 2a.

FIG. 3b is, in front perspective view, the clamping member of FIG. 3a.

FIG. 5b is, in side elevation view, the hinge of FIG. 5a.

FIG. 6b is an exploded perspective view of the embodiment of FIG. 6a.

FIG. 6c is, in plan view, the partially assembled clamp of FIG. 6a.

DETAILED DESCRIPTION OF EMBODIMENTS OF THE INVENTION

Figure 1A:
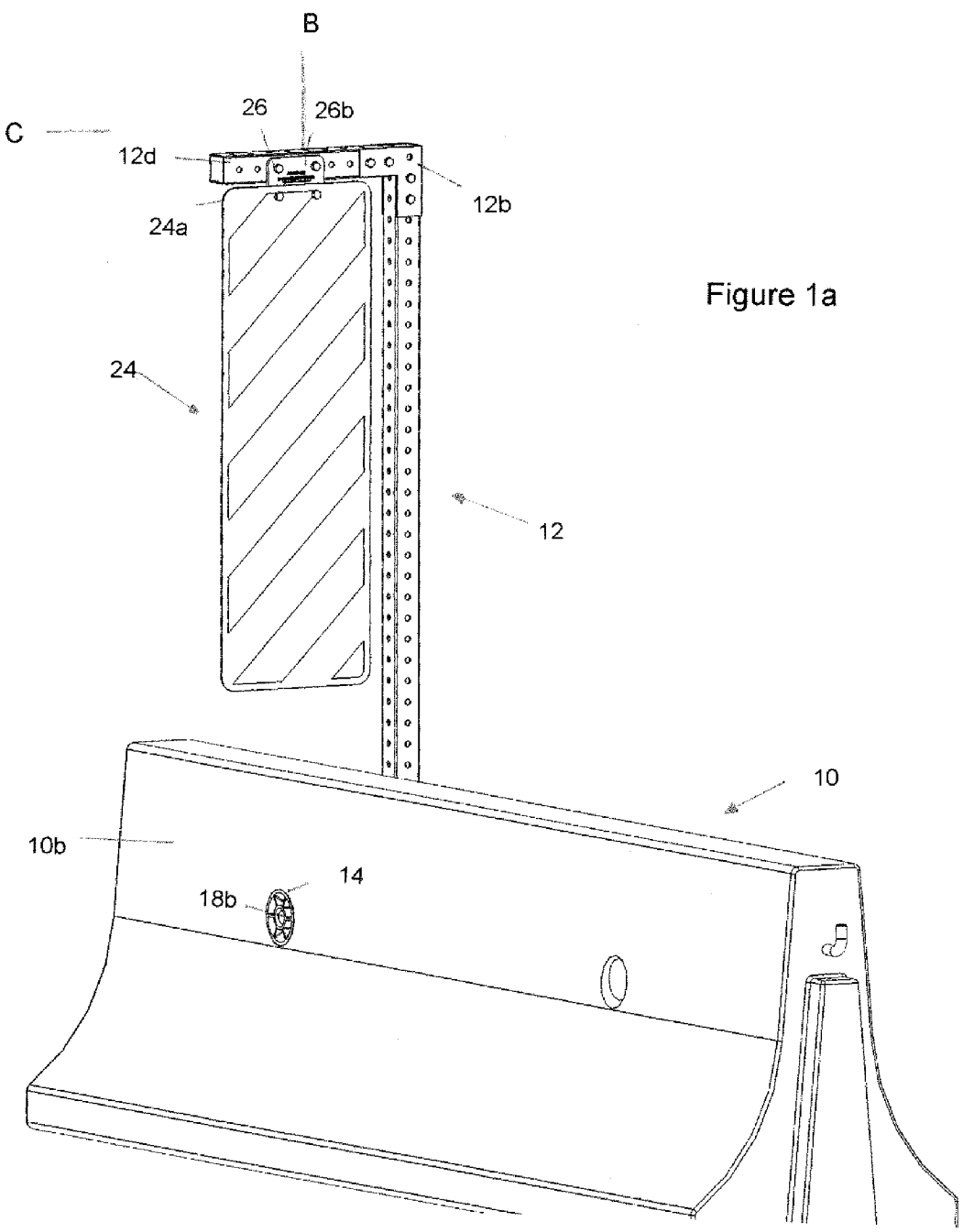
FIG. 1a is, in front perspective view, a signpost and sign mounted to a concrete barrier by the clamping system according to the present invention.

One aspect of the present invention is the provision of a barrier connector for the flush mounting of the base of a sign post to a concrete barrier using only one of the two bores which typically extend laterally completely through the concrete barrier. Typically in the prior art of which applicant is aware attempts to mount sign posts to concrete barriers have required the bracing of the post using at least two of the barrier bores so as to support the vertical sign post by triangulating the bracing upwardly between the two bores. Typically also, in prior art attempts at attaching a sign post to concrete barriers, the attachment mechanism protrudes from the road side of the barrier and, in applicant's experience, the protrusion on the roadside of the concrete barrier may be struck by a snowplough blade thereby damaging the connector and potentially knocking down the signpost.

Thus one of the objects of the present invention is to provide a simple attachment mechanism for attaching the base of a signpost to only a single bore which extends laterally through a concrete barrier such as concrete barrier 10 as seen in the accompanying drawings wherein like reference numerals denote corresponding parts in each view.

Barrier 10 has a laterally extending bore 10a extending completely therethrough. A Telespar™ signpost 12, such as supplied by Western Canadian Tube Products of Coquitlam, B. C., Canada, has a base end I 2a and opposite upper end 12b. Signpost 12 is mounted using only a single bore 10a in barrier 10 by means of a clamping device according to one aspect of the present invention having a traffic-side clamp 14 and an opposite shoulder-side clamp 16. Clamps 14 and 16, which may for example, and without intending to be limiting, be made of aluminium, are mounted in opposed facing relation on either end of bore 10a and drawn towards one another by means of an elongate clamping mechanism such as for example by bolt 18.

Traffic-side clamp 14 has a substantially planar exterior surface 14a and an opposite raised platform 14b. A hole 14c extends through platform 14b and surface 14a. In a preferred embodiment, raised platform 14b is sized to fit into bore 10a. Surface 14a has a rim which extends beyond raised platform 14b. The rim has a bevelled surface 14d. Bevelled surface 14d and radially outwardly platform 14b fit substantially conformally into the traffic-side end of bore 10a, advantageously leaving planar surface 14a substantially flush with the outer surface 10b on the traffic-side of barrier 10.

Shoulder-side clamp 16, which is opposite to traffic side clamp 14, has a bevelled surface 16a which snugly fits into the shoulder-side end of bore 10a. Bevelled surface 16a is contiguous with collar 16b. Collar 16b protrudes outwardly from outer surface 10c on the shoulder-side of barrier 10 when shoulder-side clamp 16 is mounted into the shoulder-side opening of bore 10a.

Clamps 14 and 16 are mounted to one another by the mounting of bolt 18 journalled through both hole 16c in clamp 16 and hole 14c in clamp 14. Clamps 14 and 16 are drawn towards one another so as to tighten the clamps into the corresponding ends of bore 10a by the tightening (for example to approximately 80 PSI) of nut 18a onto the threaded end of bolt 18 protruding through hole 16c. Hole 14c and hole 16c are advantageously centroidally aligned with one another along axis A when clamps 14 and 16 are mounted into bore 10a by bolt 18. Bolt 18 may be for example between 11 and 12 inches long and in one embodiment is 11⅝ inches long.

Figure 1B:
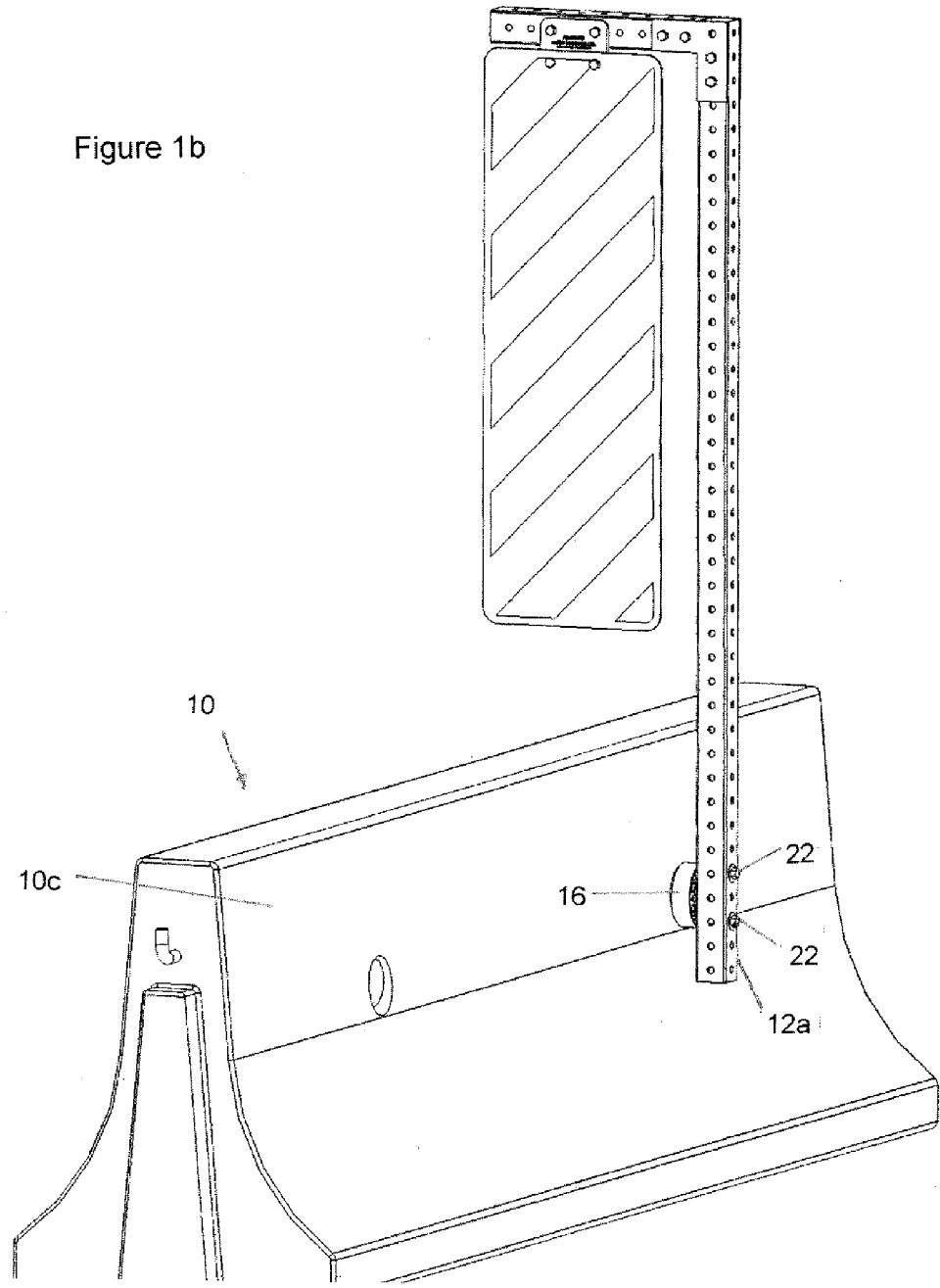
FIG. 1b is the signpost system of FIG. 1a showing the base of the signpost mounted onto a shoulder-side clamping member on the shoulder-side of the concrete barrier.
Figure 2B:
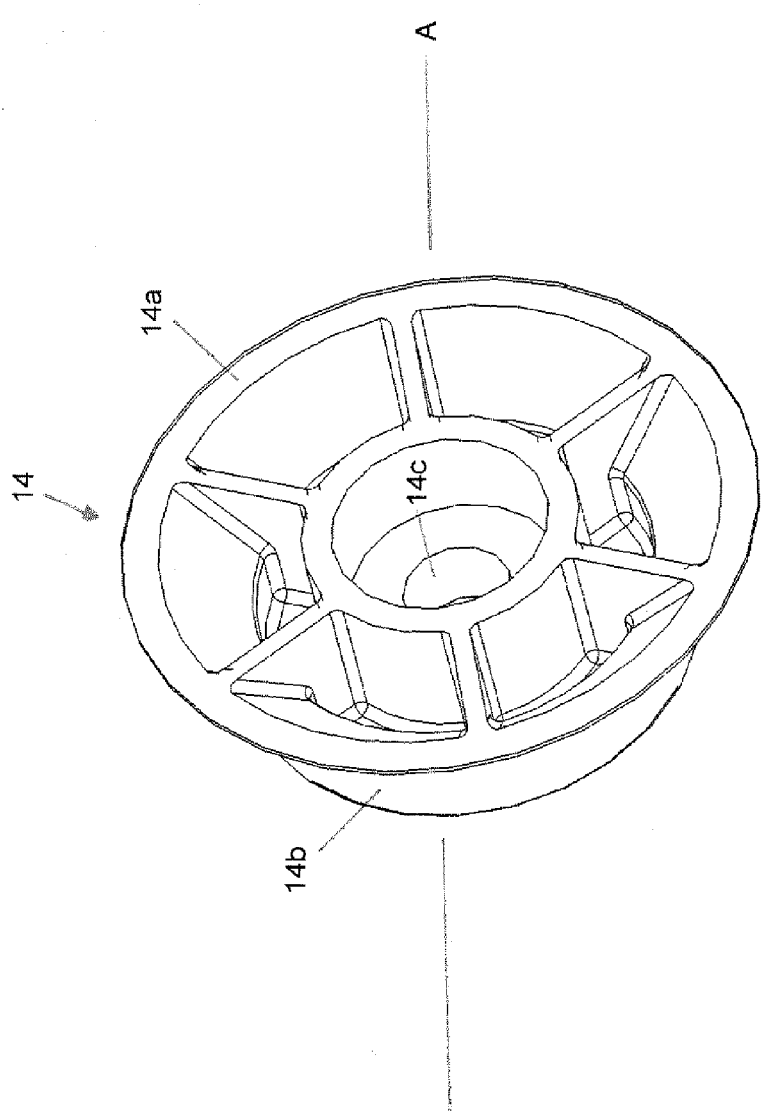
Figure 2C:
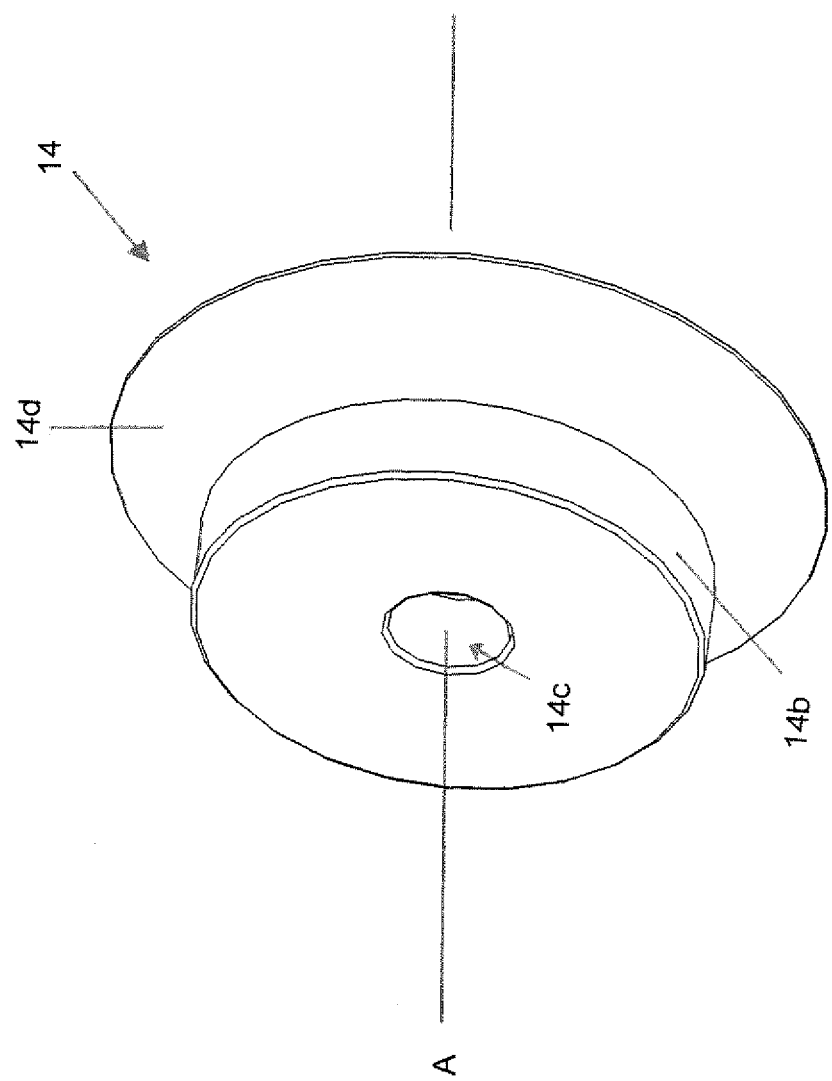
FIG. 2c, is in rear perspective view, the clamping member of FIG. 2b.
Figure 3A:
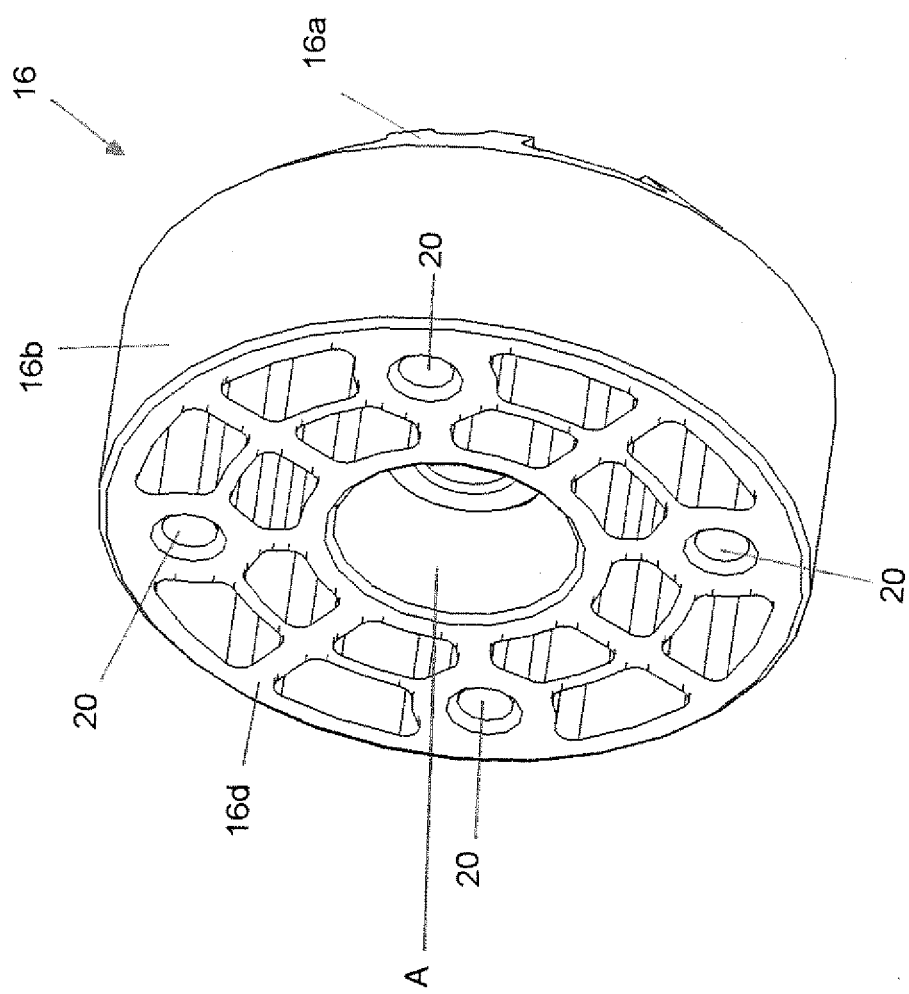
FIG. 3a is, in rear perspective view, the shoulder-side clamping member according to one embodiment of the clamping system according to the present invention.
Figure 3B:
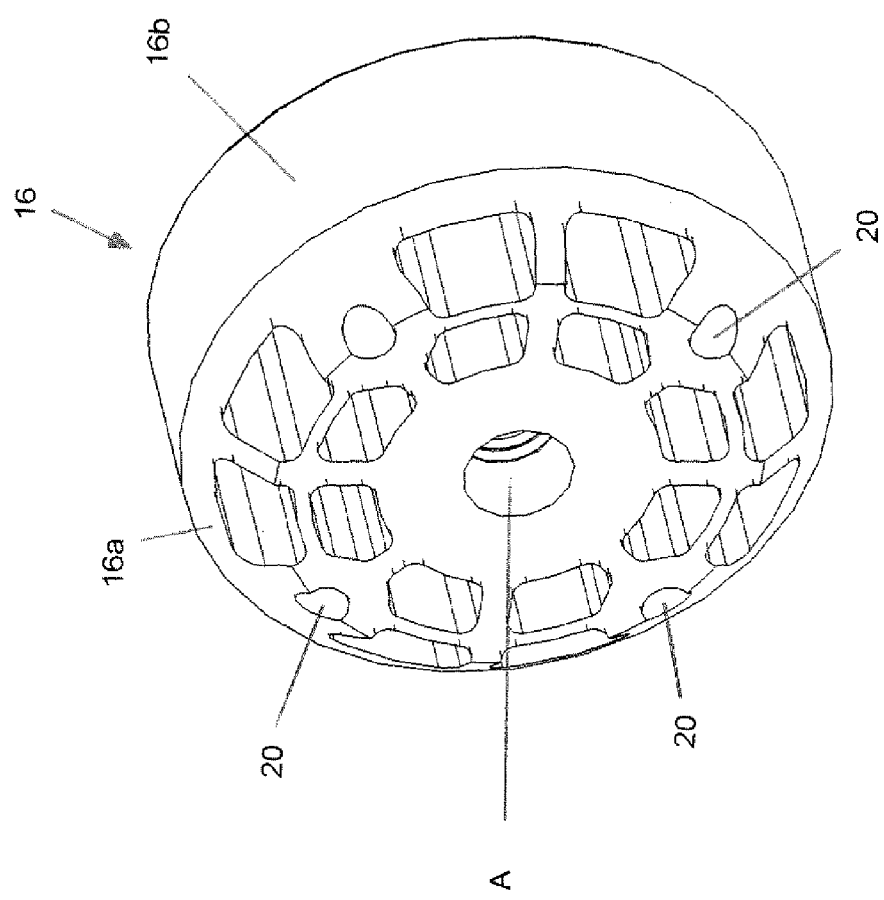
Figure 4A:
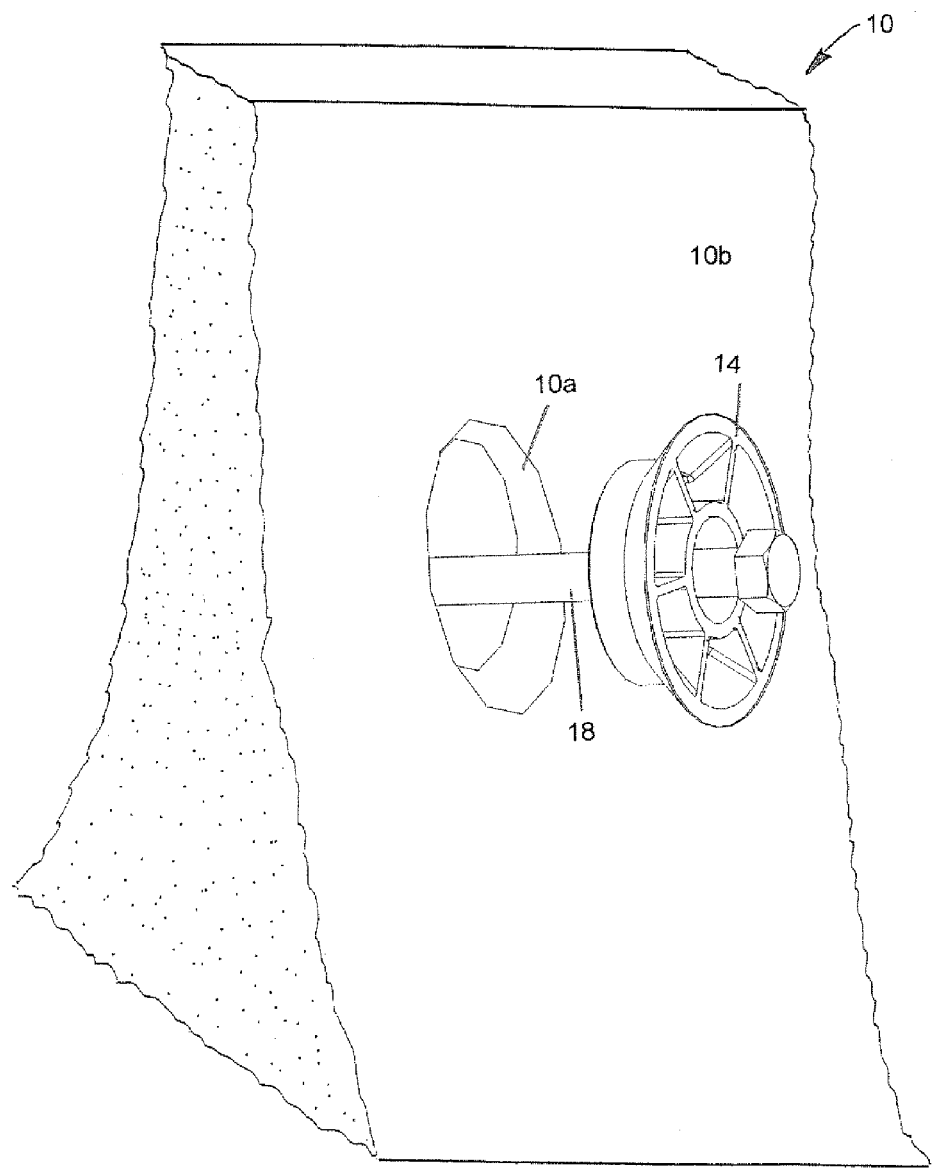
FIG. 4a is, in partially cut away front perspective view, the view of the traffic-side clamping member and concrete barrier shown in an enlarged view of a portion of FIG. 1a, with the clamping member and through-bolt partially removed from the bore through the concrete barrier.
Figure 4B:
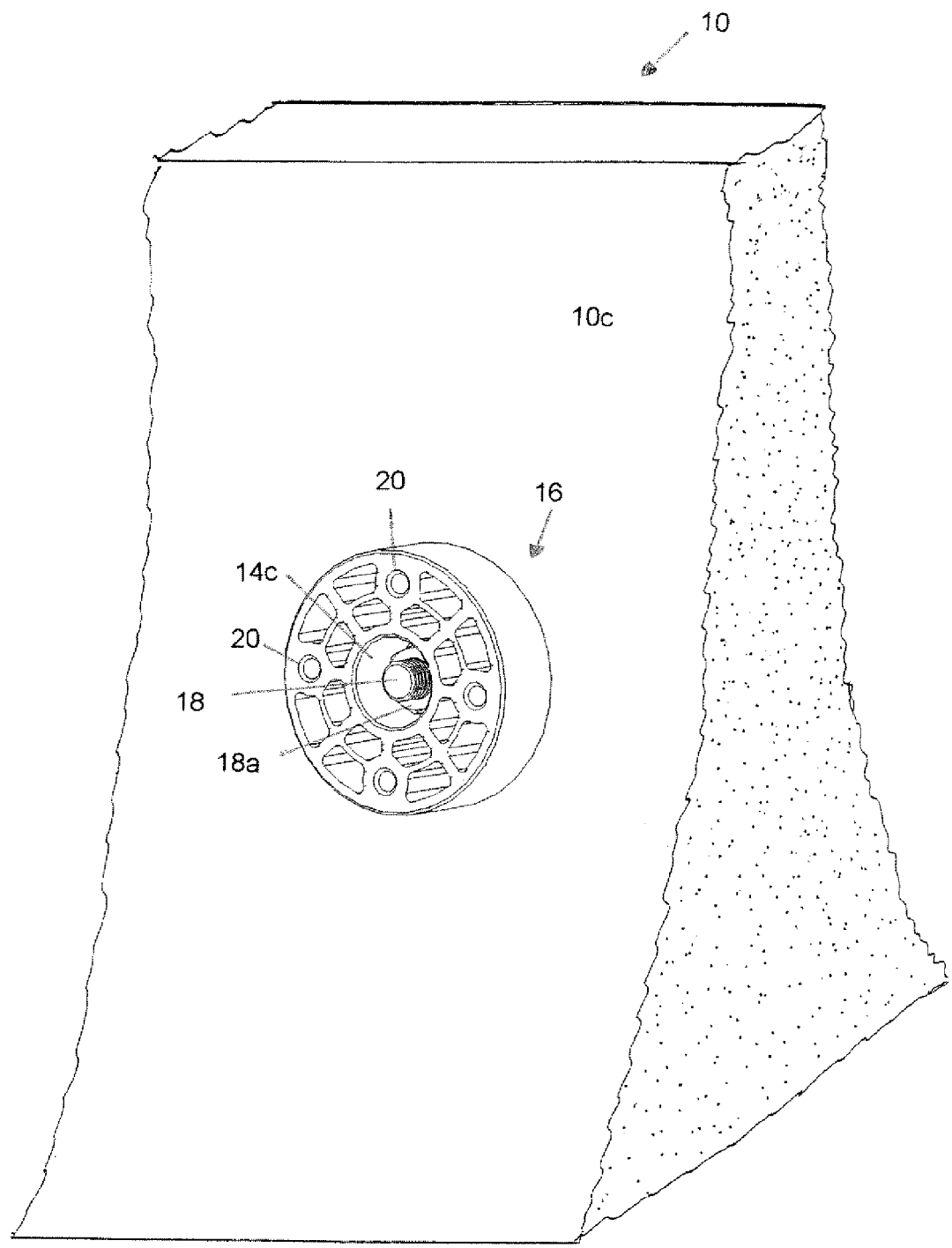
FIG. 4b is, in partially cut away rear perspective view, the section of concrete barrier of FIG. 4a showing the shoulder-side clamping member mounted into the shoulder-side end of the bore through the concrete barrier.

A radially spaced apart array of mounting apertures 20 are formed around collar 16b. Apertures 30 may be elongate holes which are parallel with hole 16c. In the illustrated embodiment which is not intended to be limiting, four such apertures 20 are formed equally spaced around hole 16e in the collar 16b. In embodiments using other than four apertures 20, it is advantageous if the number of apertures 20 are an even number so that a pair of apertures 20 which are diametrically opposed on opposite sides of hole 16c may be oriented vertically as clamp 16 is mounted into bore 10a. Such a vertically oriented pair of apertures 20 provide for mounting of base end 12a of signpost 12 vertically onto the outer surface 16d of clamp 16 by the mounting of bolts 22 or other elongate fasteners through holes 12c in the base end 12a of signpost 12. In FIG. 1b bolts 22 are shown loosely fit through holes 12c and into holes 20 prior to bolts 22 being tightened to fix signpost 12 onto clamp 16.

The forming of more than one pair of apertures 20 in collar 16b, such as for example the two pairs of apertures 20 illustrated, allows for ease of repair of signpost 12 in the event of that signpost 12 is inadvertently struck, for example by a plough, or otherwise damaged. In the event of damage to bolts 22, a simple repair may be made without having to replace clamp 16 by merely slackening nut 18a on bolt 18 and rotating clamp 16 by, in the case the illustrated embodiment, ninety degrees so as to align the unused pair of apertures 20 into vertical alignment. Bolt 18 is then retightened so as to once again tightly clamp clamps 14 and 16 onto the ends of bore 10a. The base end of signpost 12 may then be mounted by bolts 22 onto the unused pair of now-vertically-aligned apertures 20.

In one embodiment which is not intended to be limiting, bevelled surface 16a may be approximately at a 45 degree angle, the height of collar 22b extending from bevelled surface 16a may be approximately 1¼ inch. The circular planer outer surface 16d may have a diameter of approximately 4 inches and the opposite parallel face of clamp 16, that is, the face protruding into bore 10a, may be approximately 3 inches in diameter. The exterior end of hole 16c may be approximately 1⅜ inches so as to accept nut 18a therein. A shoulder is provided on the interior end of hole 16c so as to restrict the hole size to for example 11/16 of an inch so as to accept snugly journalled therethrough bolt 18. Apertures 20 may for example be 3/8 of an inch holes extending parallel to hole 16c to a depth for example 1⅜ of an inch.

On clamp 14, hole 14c may on the exterior end of the hole may have a diameter of approximately 1⅜ inch, with the hole size again reduced on the interior end of hole 14c by means of an annular flange or seat so that the hole on the interior end of hole 14e, that is, the end which protrudes into bore 10a, is approximately ¹¹⁄₁₆ inch in diameter so as to accept bolt 18 snugly journalled therethrough. This provides for mounting the head 18b of bolt 18 recessed into the exterior of hole 14c so as to not protrude above the planar surface 14a of clamp 14. Thus for example the 1⅜ inch diameter portion of hole 14c may extend into clamp 14 by for example a depth of 1/4 inch. Planar surface 14a may for example have a diameter of approximately 4 inches. Raised platform 14b may for example have a diameter of approximately 2⅞ inches so as to somewhat snugly fit into the traffic-side end of bore 10a in barrier 10.

In preferred embodiments of signpost 12, the upper end 12b of signpost 12 includes a substantially horizontally extending arm 12c which extends over the top of barrier 10 from the shoulder-side of the barrier so as to cantilever outwardly over the traffic-side of barrier 10. Arm 12c is sufficiently long so as to support a typically rigid planar traffic sign 24 suspended thereunder. Another of the aspects of the system according to the present invention is the provision of a resilient universal joint-like hinge between arm 12c and sign 24 so as to allow deflection of sign 24 about two degrees of freedom B and C when sign 24 is struck for example by snow thrown by a snowplough.

In applicants experience, the force with which snow, slush and ice may be thrown by a snowplough moving at traffic speeds along a roadway or highway is sufficient to damage a conventional thin metal traffic sign 24 even if the traffic sign is mounted on a hinge mechanism which allows rotation of the sign about the horizontal arm of the sign post, that is, only provides for rotational motion of the sign about one degree of freedom. Applicant had determined that the damage for example the bending of a sign 24 by impact from snow, slush and ice thrown by a plough is lessened if the sign is allowed not only to rotate about arm 12c in the fashion of a conventional hinge, that is, about one degree of freedom, but also allowed to deflect or twist about a substantially vertical axis of rotation simultaneously with rotation about an axis of rotation which is collinear with arm 12c.

Figure 5A:
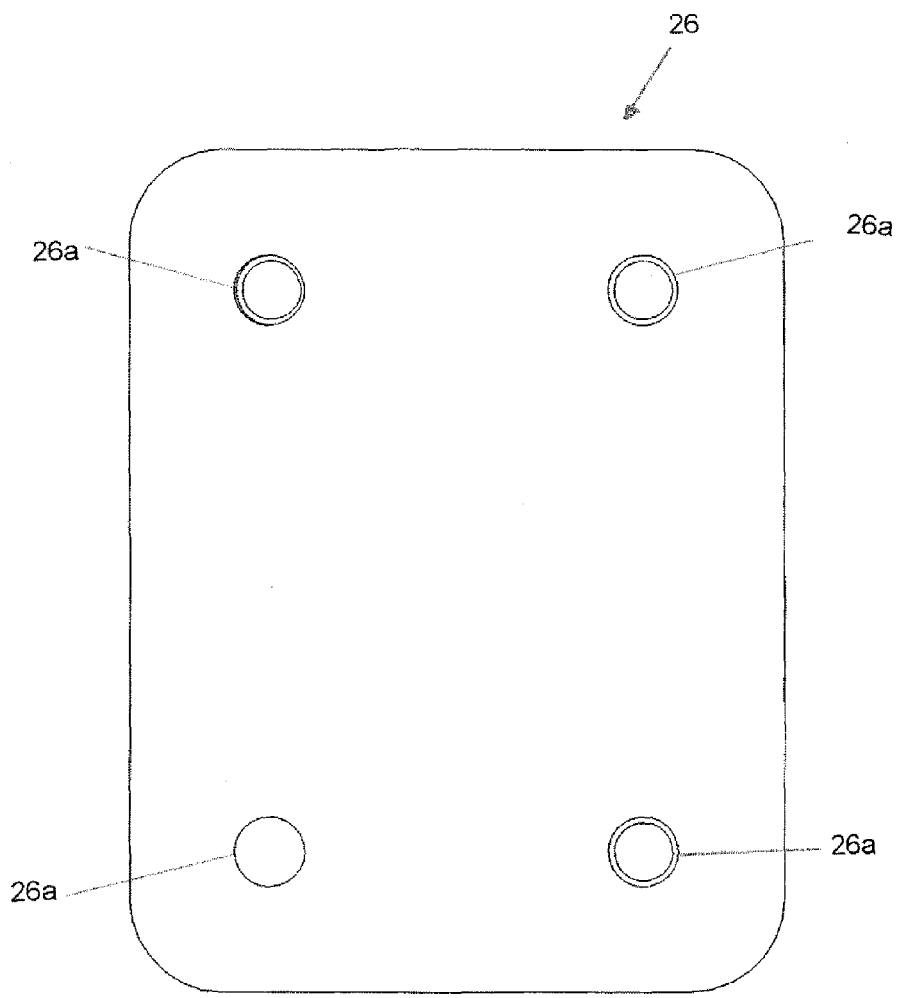
FIG. 5a is, in plan view, one embodiment of the deflecting sign hinge for mounting between the signpost horizontal arm and the upper end of the sign suspended from the signpost.
Figure 5B:
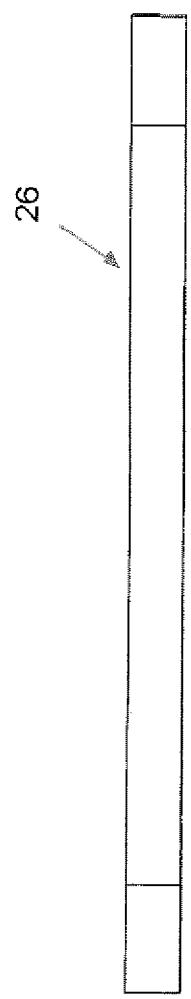
Figure 5C:
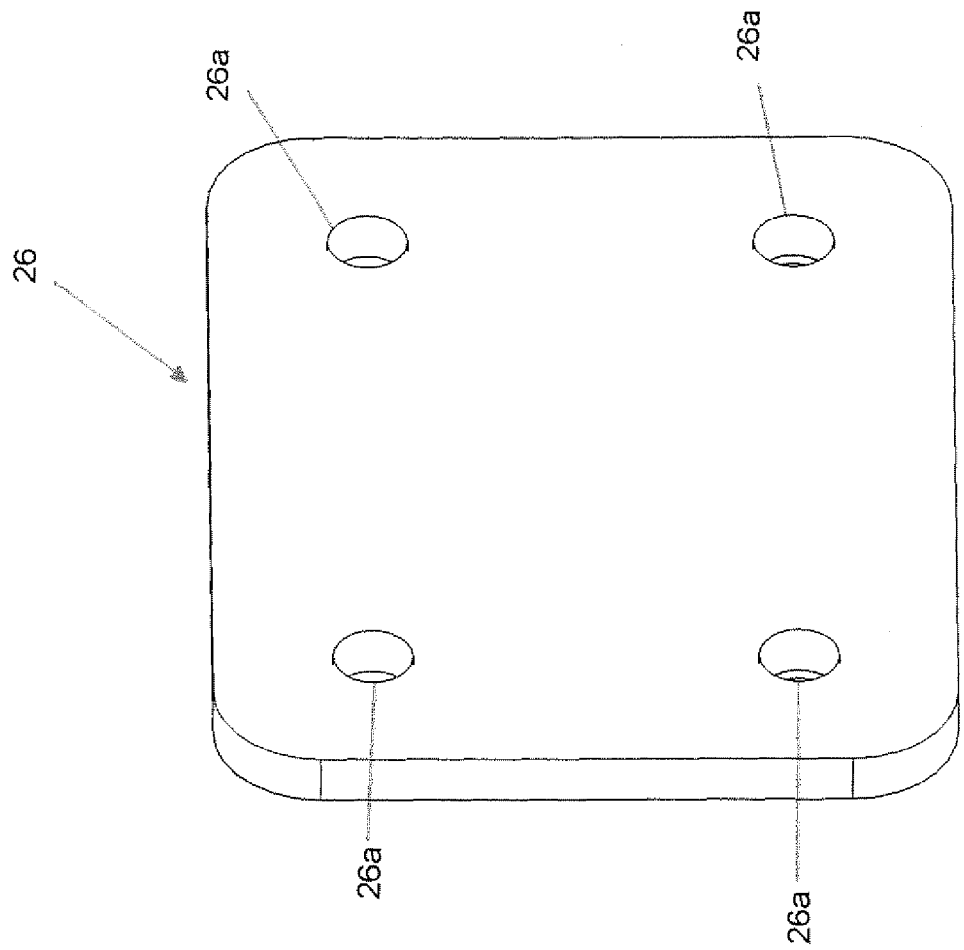
FIG. 5c is a perspective view of the hinge of FIG. 5b.

Thus a deflectable or universal joint hinge which is mounted under win I 2d and to the upper end sign 24 provides for deflection, that is, rotation about vertical axis of rotation B while simultaneously allowing rotation of sign 24 about the arm axis of rotation C. The illustrated embodiment of FIGS. 5a-5c, which are not intended to be limiting dimensionally or otherwise, shows the use of a piece of flexible sheet, which again may be substantially rectangular or square although this is again not intended to be limiting, so long as the dimensions of the sheet and in particular the free space between arm 12c and the upper edge 24a of sign 24 is sufficiently sized and unobstructed to allow deflection of the hinge in both a twisting motion about axis B and a hinge-like motion about a bending axis parallel to axis C. Polymeric materials such as polyurethane or otherwise flexible materials will work especially if the material is both flexible at cold temperatures and resilient so as to urge counter-rotation against the deflection to return the sign to its original position.

Advantageously, in embodiments employing a piece of r polymeric such as polyurethane or otherwise flexible materials, universal joint hinge 26 may be 4½×3½ (respective length x height), and ¼ inches in thickness mounted to arm 12c and upper edge 24a by means of fasteners (such as bolts 26b shown) mounted through holes 26a. Shapes of hinge 26 other than square or rectangular will also work so long as providing for the twisting deflection of the sign.

Figure 6A:
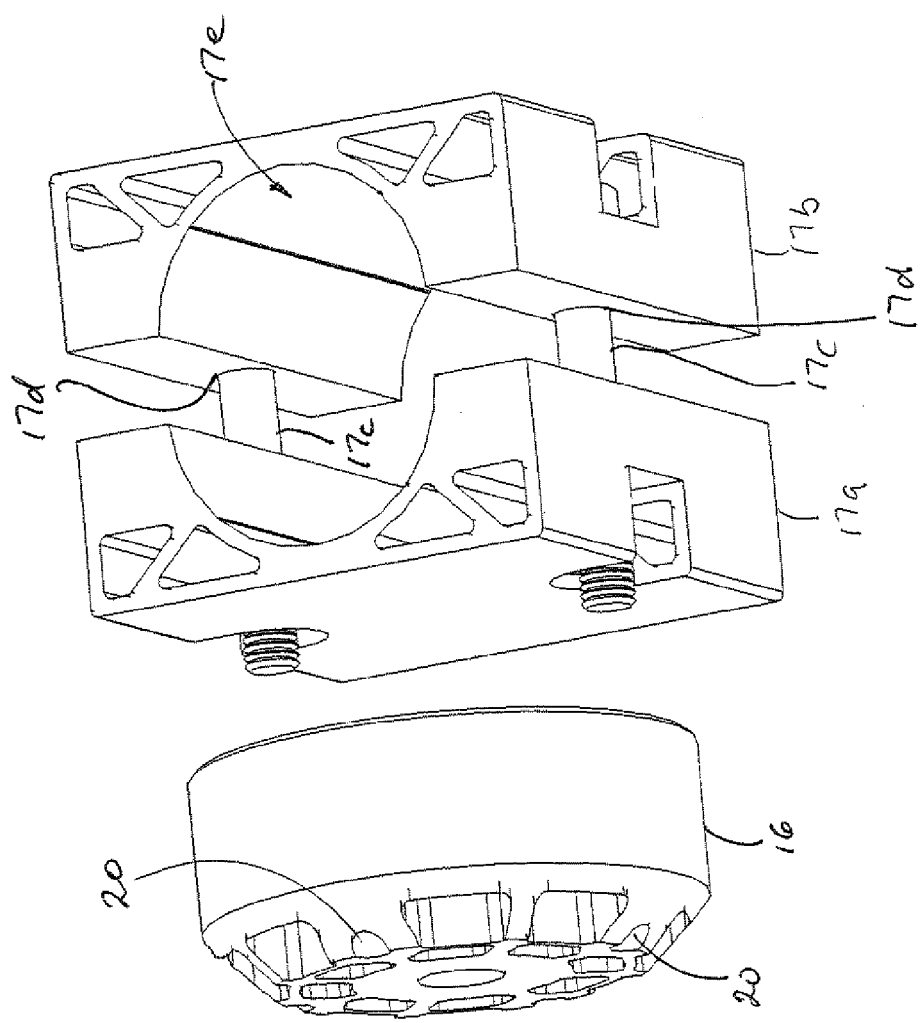
FIG. 6a is, in perspective view, an alternative embodiment of the shoulder-side clamp for vertically supporting round cross-section signpost poles against a roadside barrier, wherein the shoulder-side clamp includes a pair of mating clam-shell members.
Figure 6B:
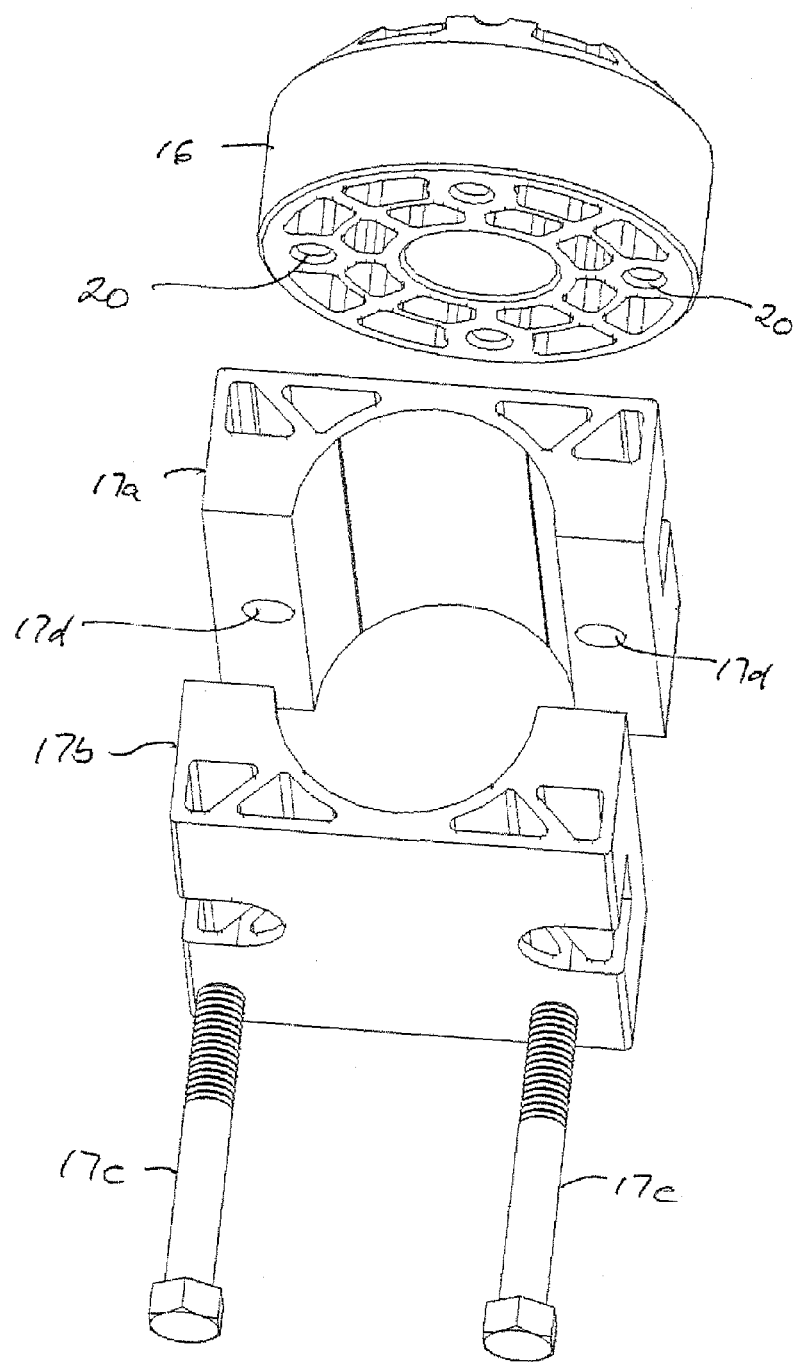
Figure 6C:
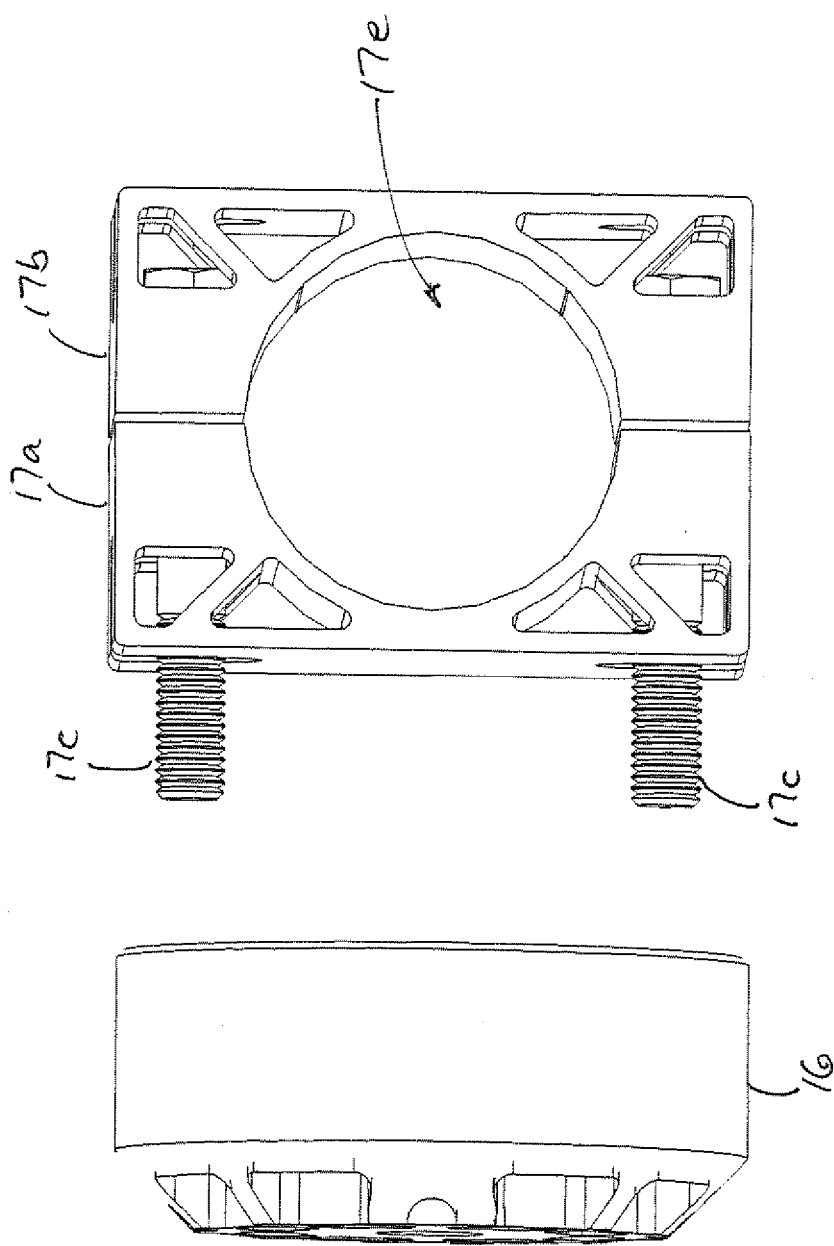

In the alternative embodiment of FIGS. 6a and 6b, shoulder-side clamp 16 has been replaced with pole clamps 17a and I 7b. Pole clamps 17a and 17b mount one to the other so as to clamp a pole (not shown), that is, a signpost 12 having a round cross-section instead of a Telespar signpost, to clamp 16, and clamp 16 mounts to barrier 10 as described below. Pole clamps 17a and 17b are mounted to one another by bolts journalled in bolt holes 17d. Bolt holes 17d are aligned with a corresponding horizontally spaced apart pair of apertures 20 in claims 16. Bolts 17c threadably mount into apertures 20 to thus clamp the pole and mount clamps 17a and 17b to clamp 16.

That is, bolts 17c mount through bolt holes 17d and, when tightened, pull pole clamp 17b against pole clamp 17a, and pull the thus mated clamps 17a and 17b against clamp 16 which is firmly mated into bore 10a. With the pole clamp, thus mounted to barrier 10, a signpost pole is positioned in the cylindrically-shaped cavity 17c formed by the opposed facing concave surfaces 17e of pole clamps 17a and 17b. Concave surfaces 17e may for example have a 1 3/16 inch radius of curvature. With the pole thus vertically positioned, the bolts 17c in bolt holes 17d, are tightened thereby firmly clamping the pole in cavity 17d so as to extend vertically upwardly from barrier 10.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A signpost system for mounting of a sign to a signpost and for mounting the signpost to a barrier having a generally horizontal bore extending completely through the barrier from a traffic side to a shoulder side of the bore, the system comprising:
    a signpost having a lower-most base end and an opposite upper end opposite said base end,
    a bore clamp comprising at least a traffic-side clamp member and a shoulder-side clamp member wherein said traffic-side clamp member is adapted to substantially mount flush into the traffic-side of the bore in the barrier and wherein said shoulder-side clamp member is adapted to mount onto the shoulder-side of the bore,
    an elongate selectively adjustable tensioner extending from and between said clamp members for mounting said clamp members on said traffic-side and on said shoulder-side of the bore respectively,
    wherein said shoulder-side clamp member is adapted for mounting to said base end of said signpost.

2. The system of claim 1 wherein said clamps are shaped to seat into opposite ends of the bore.

3. The system of claim 2 wherein said tensioner is an elongate threaded fastener.

4. The system of claim 3 wherein said fastener includes a rigid member threaded at at least one end.

5. The system of claim 1 wherein said clamp members each have a substantially centroidal hole, positioned and aligned for substantially co-axial alignment along a substantially centroidal longitudinal bore axis of the bore so as to receive journalled therein said rigid member.

6. The system of claim 5 wherein said traffic-side clamp member has a substantially planar exterior surface for said flush mount and wherein said rigid member does not protrude past said exterior surface of said traffic-side clamp member.

7. The system of claim 6 wherein said shoulder-side clamp member has an exterior surface, and wherein at least two pair of signpost mounting holes are formed therein, said mounting holes radially spaced array around said centroidal hole, and wherein each said pair of mounting holes are positioned diametrically across said centroidal hole for vertical mounting of said signpost to said shoulder-side clamp member.

8. The system of claim 7 wherein said exterior surfaces of said clamp members each have rims which are wider than corresponding openings into the bore, and wherein an underside of each said rim is bevelled to snug said rims into corresponding openings in the ends of the bore upon tensioning of said tensioner to draw said clamp members towards one another.

9. The system of claim 1 wherein said upper end of said signpost includes an arm extending over the barrier when said base end of said signpost is mounted on said shoulder-side clamp member, and wherein said system further comprises a resiliently twistable hinge joint mounted to and between said arm and the sign so as to suspend the sign below said arm, wherein said resiliently twistable hinge joint allows hinged rotation of the sign about said arm and allows simultaneous twisting rotation of the sign about a substantially vertical axis of rotation as the sign twists when impacted by a force which is off-center relative to the sign, and wherein said hinged rotation and said twisting rotations are substantially orthogonal to one another, and wherein said rotations deflect said hinge joint against a return resilient biasing of said hinge joint resiliently biasing the sign to return to an undeflected position hanging vertically and in a plane which is substantially coplanar with a plane containing said arm.

10. The system of claim 1 wherein said upper end of said signpost includes an arm extending away from the barrier when said base end of said signpost is mounted on said shoulder-side clamp member, and wherein said system further comprises a resiliently twistable hinge joint mounted to and between said arm and the sign so as to suspend the sign below said arm, wherein said resiliently twistable hinge joint allows hinged rotation of the sign about said arm and allows simultaneous twisting rotation of the sign about a substantially vertical axis of rotation as the sign twists when impacted by a force which is off-center relative to the sign, and wherein said hinged rotation and said twisting rotations are substantially orthogonal to one another, and wherein said rotations deflect said hinge joint against a return resilient biasing of said hinge joint resiliently biasing the sign to return to an undeflected position hanging vertically and in a plane which is substantially coplanar with a plane containing said arm.

11. The system of claim 9 wherein said joint is a sheet of resiliently bendable and twistable material adapted for mounting at an upper edge of said sheet to said arm and at an opposite lower edge of said sheet to an upper edge of the sign, said sheet sized to allow a twisting of said joint in a spacing between said arm and the sign, wherein the larger said spacing the greater the degree of relative twisting rotation afforded between said arm and the sign upon force applied asymmetrically to the sign.

12. The system of claim 1 wherein said shoulder-side clamp member is a clam-shell pair of clamps adapted to clamp said base end of said signpost between said clam-shell pair of clamps.

13. The system of claim 12 wherein said clam-shell pair of clamps define an elongate cavity therebetween when mounted to one another, said cavity sized to snugly receive therein said base end of said signpost, and wherein a barrier-side clamp of said clam-shell pair of clamps mounts to said tensioner.

14. The system of claim 13 wherein said signpost is a pole and said cavity is cylindrical.

15. The system of claim 14 wherein said cylindrical cavity is formed by opposed facing concave surfaces formed in said pair of clamps.

16. The system of claim 11 wherein said sheet is polyurethane.

17. The system of claim 10 wherein said joint is a sheet of resiliently bendable and twistable material adapted for mounting at an upper edge of said sheet to said arm and at an opposite lower edge of said sheet to an upper edge of the sign, said sheet sized to allow a twisting of said joint in a spacing between said arm and the sign, wherein the larger said spacing the greater the degree of relative twisting rotation afforded between said arm and the sign upon force applied asymmetrically to the sign.

18. The system of claim 17 wherein said sheet is polyurethane.

19. The system of claim 5 wherein said rigid member is a bolt and wherein a nut threadable mounts onto said bolt.

* * * * *